United States Patent [19]

Imaizumi et al.

[11] Patent Number: 4,948,283
[45] Date of Patent: Aug. 14, 1990

[54] APPARATUS FOR PROCESSING AND PRINTING DOCUMENT

[75] Inventors: Katsumi Imaizumi, Kitaibaraki; Keiji Kamio, Hitachi; Kazuhiko Nishiyama, Tokyo, all of Japan

[73] Assignees: Hitachi, Ltd., Tokyo; Hitachi Taga Engineering Ltd., Hitachi, both of Japan

[21] Appl. No.: 266,984

[22] Filed: Nov. 3, 1988

[30] Foreign Application Priority Data

Nov. 4, 1987 [JP] Japan .................. 62-277456

[51] Int. Cl.$^5$ ............................ B41J 13/10
[52] U.S. Cl. .................. 400/647.1; 400/23; 400/36
[58] Field of Search ............ 400/647, 647.1, 605, 400/84, 595, 597, 691, 23, 36

[56] References Cited

U.S. PATENT DOCUMENTS

| 4,234,261 | 11/1980 | Hendrischk et al. | 400/605 X |
| 4,619,197 | 10/1986 | Pailler | 400/605 X |
| 4,655,625 | 4/1987 | Brull et al. | 400/605 |
| 4,828,417 | 5/1989 | Tana et al. | 400/647.1 X |

FOREIGN PATENT DOCUMENTS

| 113485 | 2/1980 | Japan | 400/708 |
| 111281 | 8/1980 | Japan . | |
| 56-10472 | 2/1981 | Japan . | |
| 171980 | 10/1983 | Japan | 400/84 |
| 90785 | 5/1985 | Japan . | |
| 131272 | 7/1985 | Japan . | |
| 137675 | 7/1985 | Japan . | |
| 27427 | 6/1987 | Japan . | |
| 234963 | 10/1987 | Japan . | |

Primary Examiner—Edgar S. Burr
Assistant Examiner—Ren Yan
Attorney, Agent, or Firm—Antonelli, Terry, Stout & Kraus

[57] ABSTRACT

A document processing printing apparatus such as a word processor has a main body constituted by a box-like frame. The frame includes a top surface serving as a flat paper supply guide surface. A print output unit included in the frame has at least one pair of rollers for transferring a recording paper along and on the paper supply guide surface and includes a flat platen, and a printing head.

3 Claims, 5 Drawing Sheets

APPARATUS FOR PROCESSING AND PRINTING DOCUMENT

BACKGROUND OF THE INVENTION

1. Field of the Invention

This invention relates to a composite type of document processing/printing apparatus having an external storage unit, a display unit, a print output unit, and a control circuit unit for editing document data, storing this data in the storage unit, displaying the data on the display unit and making the print output unit perform printing, and combining these units integrally with a main body of the apparatus.

2. Description of the Prior Art

In general, a document processing/printing apparatus, such as a word processor or a personal computer, is substantially constituted by an input unit such as a keyboard for inputting character data and control commands, a storage unit such as a floppy disk unit for storing edited document data, a display unit such as a liquid crystal display or a CRT for displaying document data during or after editing and the control command menu, a print output unit for printing characters on a recording paper on the basis of the document data, and a control circuit unit for controlling editing of document data and the operations of these units.

Conventionally, in a document processing/printing apparatus of this type, the above-mentioned units are constructed independently and are thereafter connected to each other by cables, thereby completing the whole of the apparatus. Recently, composite-type apparatus constructed by integrally combining the respective units are increasingly developed. In particular, a composite type of document processing/printing apparatus constructed by integrating the external storage unit, the display unit, the print output unit and the control circuit unit is advantageous in that it has a reduced overall size and is convenient in terms of handling. This composite type of document processing/printing apparatus is disclosed, for example, in Japanese Patent Examined Publication No. 62-27427.

In the above-described composite type of document processing/printing apparatus, the print output unit is disposed in an upper portion of the main body frame in consideration of the feeding/drawing operation of recording paper. As disclosed in Japanese Patent Unexamined Publication No. 60-90785, the print output unit is designed to feed a recording paper sheet downwards, bend and backwardly turn the sheet within the main body, and draw it upwards after printing.

Since, in the thus-constructed apparatus, the sheet is curved and turned backward along a curved sheet path in the print output unit, the radius of curvature of the curved sheet path must be reduced in order to reduce the overall size of the apparatus. This makes it difficult to print characters on a thick recording sheet such as a post card.

A separate type of print output unit independent of other units has been proposed. Such one is, for example, disclosed in Japanese Patent Unexamined Publication No. 60-131272. The separate type of print output unit is designed to transport a recording sheet to or from a platen in the horizontal direction. However, this type of printing unit is disadvantageous owing to lack of consideration of printing on thick recording sheets, since, in this unit, the leading end of a recording sheet supplied from a table disposed on the front side is curved in a curved transfer path formed at the rear of a printing section. In addition, it is difficult to incorporate this unit in a composite type of document processing/printing apparatus designed to reduce the overall size and simplify the structure, because the structure of this unit is complicate due to the provision of the tiltable table and the curved transfer path formed in the main body frame.

Japanese Patent Unexamined Publication No. 62-234963 disclose a word processor having a print output unit tiltably connected to the main body of the apparatus. This apparatus is also unsatisfactory in terms of recording sheet guidance.

OBJECT AND SUMMARY OF THE INVENTION

It is an object of the present invention to provide, with a view to solving the above-described problems of the conventional apparatus, a composite type of document processing/printing apparatus which is smaller and simpler and which is capable of smoothly printing characters on thick recording paper.

To this end, the present invention provides a composite type of document processing/printing apparatus having a main body frame, and including an input unit for inputting character data and control commands, an external storage unit, a display unit, a print output unit, and a control circuit unit for editing document data on the basis of inputs supplied from the input unit, storing the data in the storage unit, displaying the data on the display unit and making the print output unit perform printing, the units except the input unit being integrally combined and incorporated in the main body frame of the apparatus, wherein the main body frame includes a top surface serving as a first paper supply guide surface generally horizontal and flat, and wherein the output print unit comprises a recording head, a pair of paper supply rollers disposed at the rear of the first paper supply guide surface, the pair of paper supply rollers defining a paper supply plane substantially flush with the first paper supply guide surface, a flat platen juxtaposed with the pair of paper supply rollers, the flat platen having an upper major surface substantially flush with the first paper supply guide surface, a paper supply guide plate tiltable disposed at the rear of the first paper supply guide surface, the paper supply tiltable guide plate capable of defining a second paper supply flat guide surface flush with the first paper supply guide surface, and a carriage mechanism capable of moving the recording head and an ink ribbon along the flat platen while positioning the recording head and the flat platen so that the recording head faces the major surface of the flat platen and while interposing the ink ribbon between the flat platen and the recording head.

This print output unit is capable of flatly supplying a recording sheet in the horizontal direction by utilizing the flat first paper supply guide surface and the flat second paper supply guide surface, thereby enabling printing on a thick recording sheet without curving this sheet. Moreover, since a paper supply system and a printing system are constituted by the pair of paper supply rollers, the flat platen and the carriage mechanism, which are based on a flat paper supply path, they can be formed along the upper side of the main body frame with a simple structure of a reduced size.

BRIEF DESCRIPTION OF THE DRAWINGS

The accompanying drawings shows a word processor in accordance with one embodiment of the present invention.

DESCRIPTION OF THE PREFERRED EMBODIMENT

An embodiment of the present invention will be described with reference to the accompanying drawings.

Figure 6:
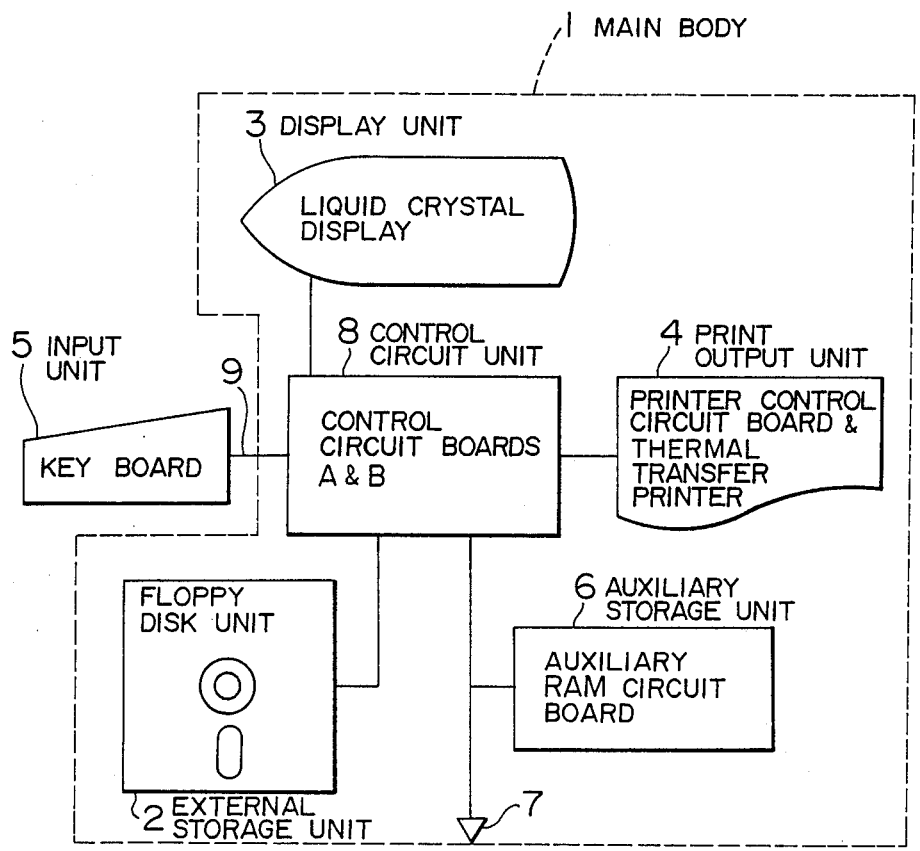
FIG. 6 is a block diagram of the overall electrical circuit.

Referring first to FIG. 6, in a main body 1 of the word processor are provided, an external storage unit 2 constituted by a floppy disk unit, a display unit 3 constituted by a liquid crystal display, a print output unit 4 constituted by a printer controlling circuit board and a thermal transfer printer, and a control circuit unit 8 constituted by a pair of control circuit boards A and B connected to an auxiliary storage unit 6 and an external auxiliary unit connector 7, which will be described later. The control circuit unit 8 is adapted to edit document data on the basis of inputs supplied from an input unit 5 which will be also described later, display this data on the display unit 3, and make the print output unit 4 output a print. These units 2, 3, 4 and 8 are integrally combined with each other. The input unit 5 which is constituted by a keyboard is connected to the main body 1 via a cable 9 so as to be electrically connected to the control circuit unit 8. The auxiliary storage unit 6 has an auxiliary RAM circuit board on which a RAM is mounted to heighten the data processing performance throughout of the control circuit unit 8. The external auxiliary unit connector 7 is used to establish connection to an external auxiliary unit such as an image reader.

The structure of the word processor constituted by these units will be described below with reference to FIGS. 1 to 5.

Figure 3:
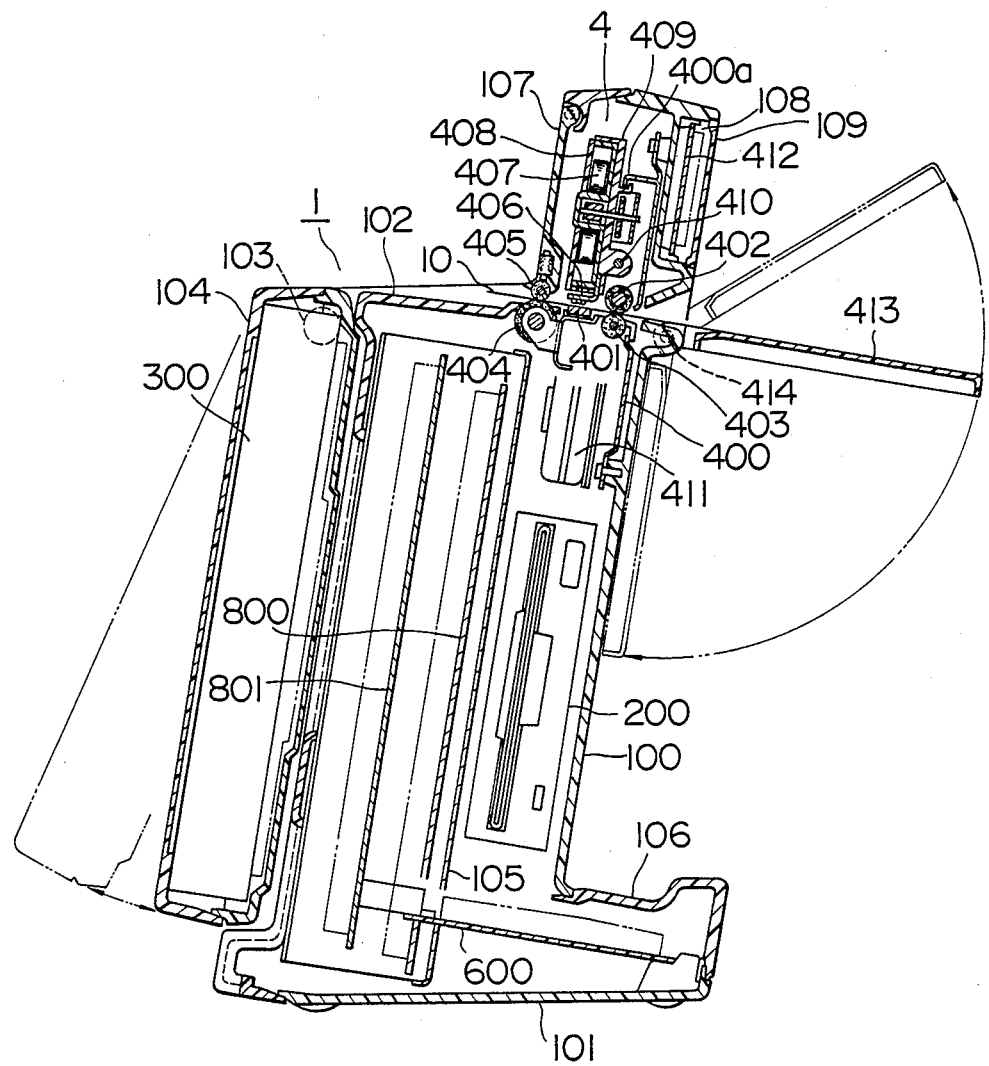
FIG. 3 is a longitudinal sectional side view of a main body shown in FIG. 1.

As shown above structural base of the main body 1 is a box frame 100 having a generally L-shaped longitudinal side sectional configuration (FIG. 3). A bottom portion 101 formed with an extension of the box frame 100 constitutes a foot portion which enables the main body 1 to stand stably. A portion of the top end of the box frame 100 is provided with a flat surface which serve as a flat guide surface 102 for guiding a sheet to be supplied to the print output unit 4. An auxiliary frame 104 is disposed in front of the box frame 100 such that it is tiltable about a pin connection supporting point 103 provided at the upper end of a front portion of the main body. A liquid crystal display 300 is mounted in the auxiliary frame 104. A steel frame 105 is fixed in the box frame 100 at the center thereof. A pair of control circuit boards 800 and 801 and an auxiliary RAM circuit board 600 are attached to the steel frame 105 as shown in FIG. 3. A portion of a bulge of the foot portion 101 provides a space in which a part of the auxiliary RAM circuit board 600 is accommodated. The bulge portion is provided with a detachable cover 106 for enabling the auxiliary RAM circuit board 600 to be mounted or dismounted.

A floppy disk drive unit 200 is mounted in the main body 1 in such a manner that an operational panel of this unit is exposed through an opening formed in a side wall of the box frame 100. A floppy disk is inserted or drawn out from the side of the main body 1.

Figure 1:
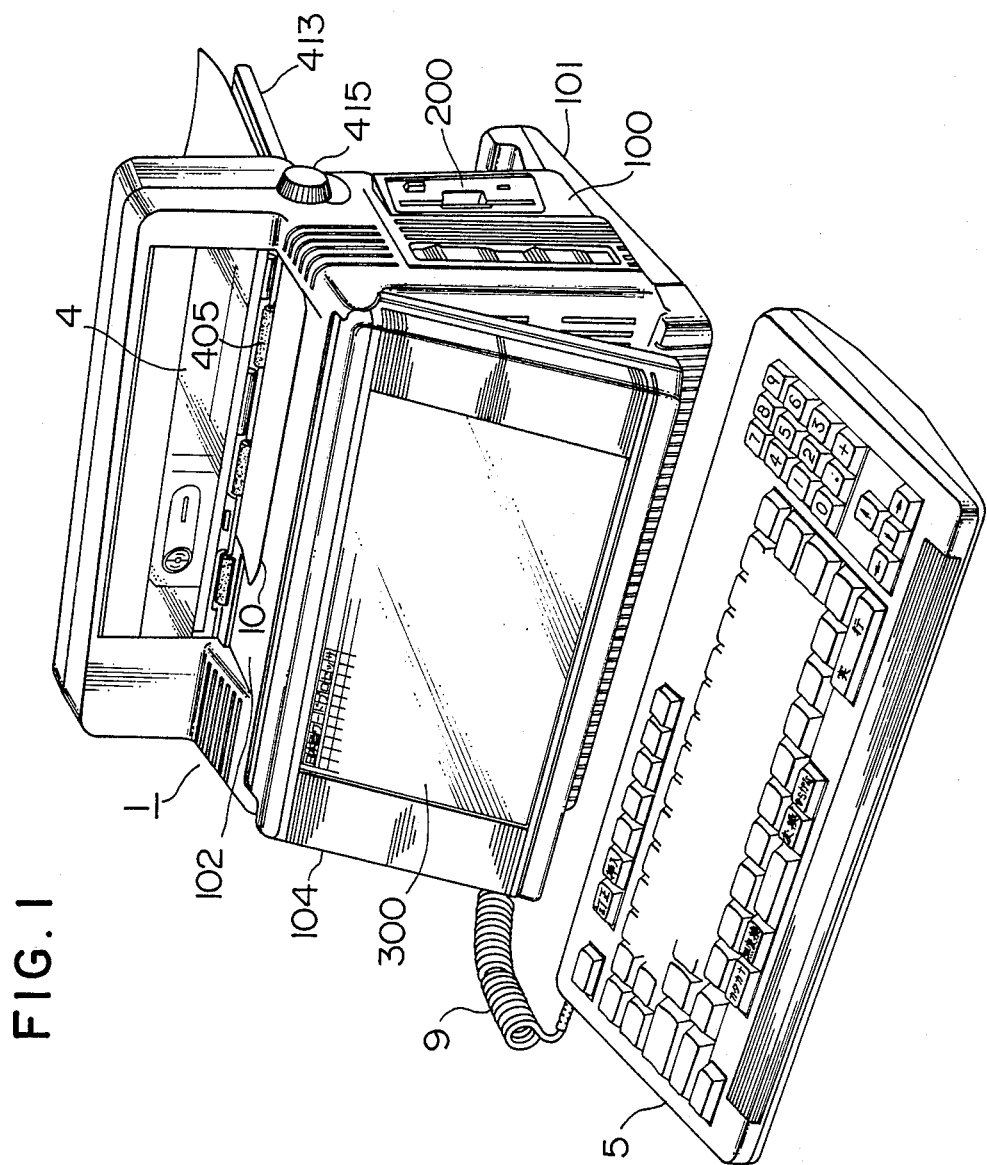
FIG. 1 is a perspective view of the whole of the word processor.
Figure 2:
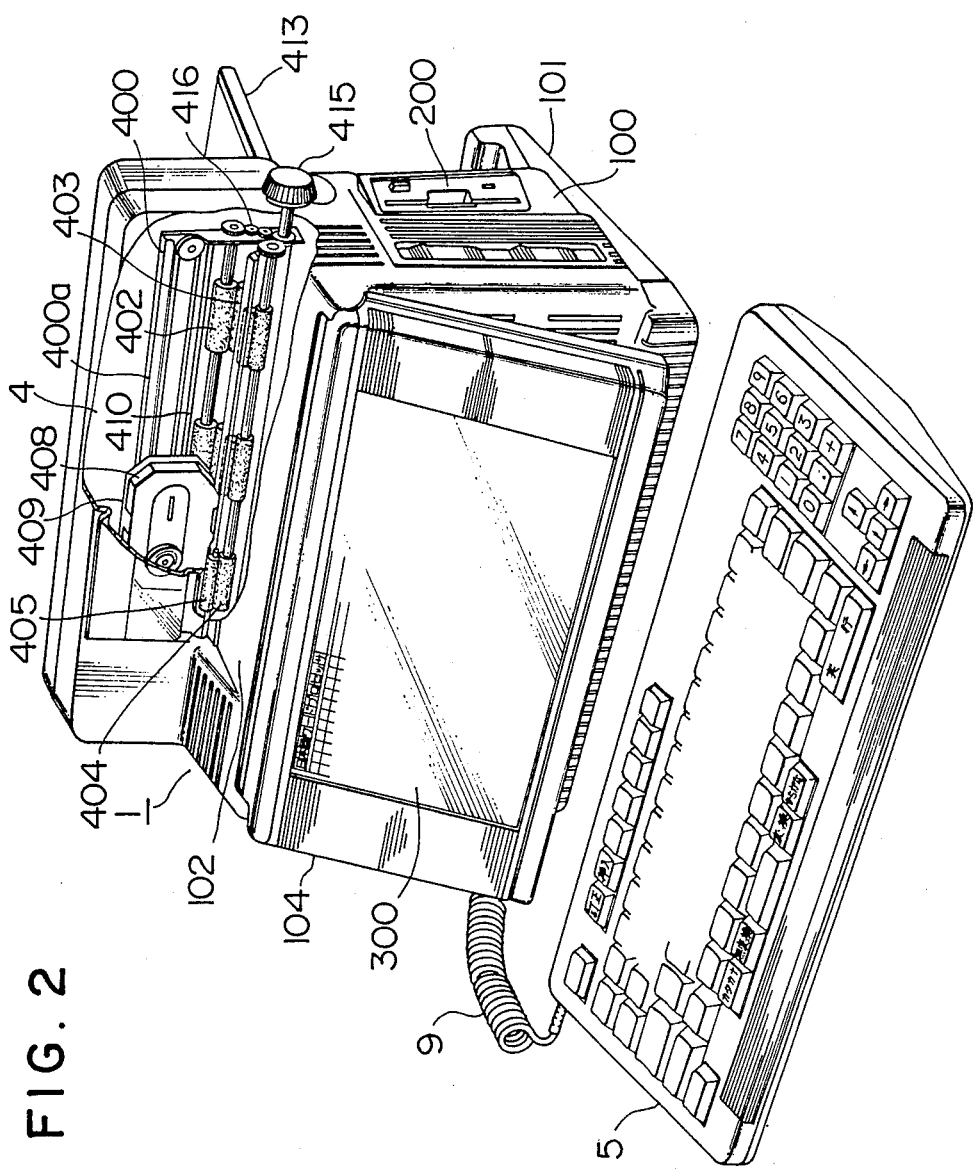
FIG. 2 is a partially cutaway view of the word processor shown in FIG. 1.

The print output unit 4 is constructed at the rear of the generally flat sheet guide surface 102 provided on the top end of the box frame 100. The main structural base of the print output unit 4 is a steel frame 400 which is screw-mounted to inner side of the box frame 100, and components which will be described later are mounted on the frame 400 as shown in FIG. 2. A flat platen 401 is disposed in such a manner that it is directed upwards and is substantially flush with the sheet supply guide surface 102. Three pairs of first sheet supply rollers are disposed in rear of the flat platen 401, and another three pairs of second sheet supply rollers are disposed in front of the flat platen 401. Each of the pairs of first sheet supply rollers is constituted by a drive roller 402 and a pinch roller 403. These first sheet supply rollers 402, 403 are juxtaposed with the flat platen 401 at the rear of this platen 401 so that the sheet supply plane defined between the rollers 402 and 403 is substantially flush with the sheet supply guide surface 102. Each of pairs of the second sheet supply rollers is constituted by a drive roller 404 and a pinch roller 405. Also, these second sheet supply rollers 404, 405 are juxtaposed with the flat platen 401 and in front of this platen 401 so that the sheet supply plane defined between the rollers 404 and 405 is substantially flush with the sheet supply guide surface 102. The pinch roller 405 is attached to a lower end of front cover 107 which will be described later. A thermal transfer recording head 406 is disposed above the flat platen 401 so as to face downward. The thermal head 406 heats up an ink ribbon 407 while pressing the back surface of this ribbon so as to melt the ink and attach the molten ink to a recording sheet 10 placed on the flat platen 401, thereby performing recording (printing). The thermal transfer recording head 406 and an ink ribbon cassette 408 in which the ink ribbon 407 is accommodated are mounted on a carriage 409. The carriage 409 is supported on the steel frame 400 by a rail portion 400a and a guide shaft 410 so that the recording head 406 and the cassette 408 can be moved along the flat platen 401. A drive motor 411 is used as a power source for rotating the drive rollers 402 and 403 and for moving the carriage 409.

The ink ribbon cassette 408 is detachably attached on the front side surface of the carriage 409. It is possible to easily replace the cassette 409 by opening the front cover 107.

A printer control circuit board 412 is accommodated in a recess 108 formed in a rear side wall of an upper portion of the box frame 100 and is covered with a back cover 109. An electrical circuit formed on the circuit board 412 operates to control heating of the thermal recording head 406, the direction and the timing of rotation of the drive rollers 402 and 404 performed by the drive motor 411, and the direction and the timing of movement of the carriage 409.

A guide plate 413 which provides a second guide surface at the rear of the first sheet supply guide surface 102 is tiltably attached to the box frame 100 by a pin connection support shaft 414. When the guide plate 413 is not used, it is swung back to be placed on a rear surface of the box frame 100. When the guide plate 413 is used, it is moved upward to a horizontal position at which the second guide surface becomes flush with the sheet supply guide surface 102 or to a position at which the second guide surface is inclined such that its rear end is higher than its front end. A printer knob which projects from a side surface of the box frame 100 is linked to the drive rollers 402 and 404 by a gear mechanism 416.

Figure 4:
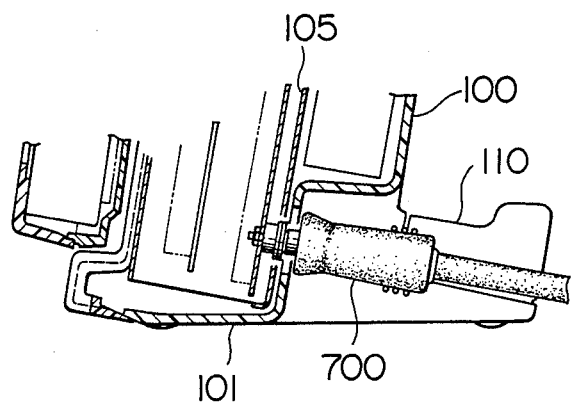
FIG. 4 is a fragmental sectional side view of an external auxiliary unit connector.
Figure 5:
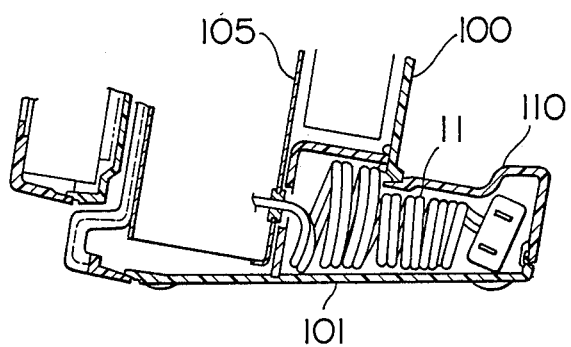
FIG. 5 is a fragmental sectional side view of a power code accommodating portion.

The bulge of the foot portion of the box frame 100 is not formed uniformly through the overall width of this frame. The bulge is discontinuous at a central portion of the box frame 100. The cavity formed in one of the separated bulges is, as described above, used as the space in which the auxiliary RAM circuit board 600 is accommodated while the cavity formed in the other one of the separated bulges is used as a space in which a power cord 11 is accommodated. A detachable cover 110 is provided to cover this cord accommodation as shown in FIG. 5 space. The discontinuity between the bulges is utilized as a space for introducing an external auxiliary unit connector 700 as shown in FIG. 4.

In the thus-constructed word processor, document data and editing-function and printing commands are input from the keyboard 5, are processed in the control circuit unit 8, and are thereafter supplied to the external storage unit 2, the display unit 3 and the print output unit 4.

In order to perform printing of document data formed or previously formed and stored in the external storage device 2, the printer control circuit operates so as to make the print output unit perform the following operations.

Front supply/rear discharge mode

The operation of controlling heating of the thermal transfer recording head 406, the direction and the timing of rotation of the drive rollers 402 and 404 effected by the drive motor 411, and the direction and the timing of movement of the carriage 409 is performed so that the recording paper 10 is supplied from the front side of the print unit along the paper supply guide surface 102 and is discharged onto the guide plate 413 after printing.

Front supply/front discharge mode

The operation of controlling heating of the thermal transfer recording head 406, the direction and the timing of rotation of the drive rollers 402 and 404 effected by the drive motor 411, and the direction and the timing of movement of the carriage 409 is performed so that the recording paper 10 is supplied from the front side of the print output unit along the paper supply guide surface 102 and is discharged again onto the paper supply guide surface 102. In this printing mode, the recording paper 10 goes and returns along the paper supply guide surface 102 and the second paper supply guide surface formed on the guide plate 413. The printing operation can be performed during either time of going and returning.

Rear supply front discharge mode

The operation of controlling heating of the thermal transfer recording head 406, the direction and the timing of rotation of the drive rollers 402 and 404 effected by the drive motor 411, and the direction and the timing of movement of the carriage 409 is performed so that the recording paper 10 is supplied from the guide plate 413 and is discharged to the front side onto the paper supply guide surface 102 after printing. This mode is suitable for an automatic paper supply system using additional automatic paper supply mechanism.

In accordance with the present invention, as described above, the print output unit is designed to linearly supply a recording sheet in the horizontal direction by utilizing the generally flat first paper supply guide surface provided on the upper side of the main body frame and the second paper supply guide surface defined by the tiltable guide plate disposed at the rear of the first guide surface, the second guide surface being capable of being substantially flush with the first guide surface, thereby enabling printing on a thick recording sheet without curving this sheet. Moreover, since the paper supply system and the printing system are constituted by the pair of paper supply rollers, the flat platen and the carriage mechanism, they can be formed along the upper side of the main body frame with a simple structure of a reduced size.

What is claimed is:

1. A document processing and printing apparatus having a main body frame, comprising:
    an input unit for inputting character data and control commands;
    an external storage unit;
    a display unit;
    a print-output unit; and
    a control circuit unit for editing document data on the basis of inputs supplied from said input unit, for making said external storage store the data therein, for making said display unit display the data thereof and for making said print-output unit perform printing;
    wherein in said apparatus, said external storage unit, said display unit and said print-output unit are integrally combined together and incorporated in said main body frame;
    wherein said main body frame includes a top surface providing a generally horizontal, flat first paper supply guide surface;
    wherein said print-output unit includes
    pairs of paper supply rollers disposed at the rear of said first paper supply guide surface, each pair of said paper supply rollers defining therebetween a paper supply plane flush with said first paper supply guide surface,
    a flat platen juxtaposed with said pairs of paper supply rollers and directed upwards, said flat platen having an upper surface flush with said first paper supply guide surface,
    a paper supply guide plate tiltably disposed at the rear of said first paper supply guide surface a having an upper surface which guides recording paper,
    wherein said upper surface of said paper supply guide plate defines a second paper supply guide surface flush with said first paper supply guide surface, and
    a carriage mechanism and a recording head carried by said carriage mechanism and disposed above said flat platen and directed downward to face said flat platen, said carriage mechanism moving said recording head along said flat platen, and means interposing an ink ribbon between said flat platen and said recording head.

2. A document processing and printing apparatus according to claim 1, wherein said paper supply guide plate can be tilted so that a rear end of said guide plate is positioned higher than a front end thereof.

3. A document processing printing apparatus according to claim 1, wherein said pairs of paper supply rollers include at least one pair of said paper supply rollers disposed in front of said flat platen and the rest of said pairs of said paper supply rollers disposed in rear of said flat platen, and said pairs of paper supply rollers are driven to supply a recording sheet selectively from the front side to the rear side of said main body frame, or from the rear side to the front side of said main body frame, or from the front side to the front side of said main body frame.

* * * * *